United States Patent [19]

Shingu

[11] Patent Number: 4,550,980
[45] Date of Patent: Nov. 5, 1985

[54] LIQUID CRYSTAL COMPOSITION AND DISPLAY ELEMENT INCLUDING SAME
[75] Inventor: Hiroshi Shingu, Shiojiri, Japan
[73] Assignee: Epson Corporation, Tokyo, Japan
[21] Appl. No.: 444,285
[22] Filed: Nov. 24, 1982
[30] Foreign Application Priority Data Dec. 4, 1981 [JP] Japan .................. 56-195152

[51] Int. Cl.$^4$ ............... G02F 1/13; C09K 3/34
[52] U.S. Cl. .................. 350/349; 252/299.1; 252/299.5; 252/299.63; 252/299.66; 350/350 R; 340/705
[58] Field of Search ........... 252/299.1, 299.5, 299.63, 252/299.66; 350/349, 350 R

[56] References Cited

U.S. PATENT DOCUMENTS

| | | | |
|---|---|---|---|
| 4,032,219 | 6/1977 | Constant et al. ............... | 252/299.1 |
| 4,130,502 | 12/1978 | Eidenschink et al. ......... | 252/299.63 |
| 4,154,697 | 5/1979 | Eidenschink et al. ......... | 252/299.63 |
| 4,228,030 | 10/1980 | Cole, Jr. ....................... | 252/299.63 |
| 4,285,829 | 8/1981 | Eidenschink et al. ......... | 252/299.63 |
| 4,330,426 | 5/1982 | Eidenschink et al. ......... | 252/299.63 |
| 4,331,552 | 5/1982 | Eidenschink et al. ........... | 252/299.5 |
| 4,410,445 | 10/1983 | Baur et al. ..................... | 252/299.63 |
| 4,469,618 | 9/1984 | Hasegawa et al. ............. | 252/299.63 |

FOREIGN PATENT DOCUMENTS

| | | | |
|---|---|---|---|
| 2636684 | 2/1978 | Fed. Rep. of Germany ......................... | 252/299.63 |
| 54-99785 | 8/1979 | Japan ................. | 252/299.63 |
| 55-127485 | 10/1980 | Japan ................. | 252/299.1 |
| 56-68636 | 6/1981 | Japan ................. | 252/299.5 |
| 57-34176 | 2/1982 | Japan ................. | 252/299.63 |
| 57-162773 | 10/1982 | Japan ................. | 252/299.5 |
| 57-190071 | 11/1982 | Japan ................. | 252/299.63 |

Primary Examiner—Teddy S. Gron
Attorney, Agent, or Firm—Blum, Kaplan, Friedman, Silberman & Beran

[57] ABSTRACT

A liquid crystal composition suitable for use as a host in a guest-host type liquid crystal display element including a dichroic dye as a guest is provided. The composition includes at least one liquid crystal compound represented by each of the following general formulas:

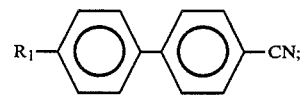

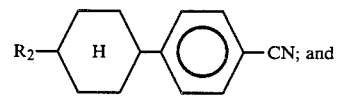

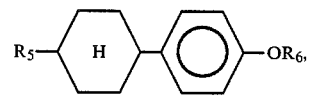

and further includes at least one compound represented by the following general formulas:

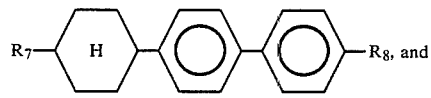

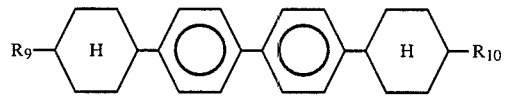

wherein $R_1$ stands for a straight-chain alkyl group having 2 to 8 carbon atoms, $R_2$ stands for a straight-chain alkyl group having 2 to 7 carbonm atoms, $R_5$ stands for a straight-chain alkyl group having three carbon atoms, $R_6$ stands for a straight-chain alkyl group having two or four carbon atoms, $R_7$ stands for a straight-chain alkyl group having five carbon atoms, $R_8$ stands for a straight-chain alkyl group having two carbon atoms, $R_9$ stands for a straight-chain alkyl group having five carbon atoms, and $R_{10}$ stands for a straight-chain alkyl group having three carbon atoms. The dichroic dye may be an azo or anthraquinone dye which is readily soluble in the composition. The compositions are highly resistant to environmental decay. A liquid crystal display element including these compositions and a liquid crystal display device including the display element are also disclosed.

17 Claims, 2 Drawing Figures

LIQUID CRYSTAL COMPOSITION AND DISPLAY ELEMENT INCLUDING SAME

BACKGROUND OF THE INVENTION

This invention relates to an nematic liquid crystal composition which exhibits positive dielectric anisotropy having no absorption in the visible region. More particularly, the invention relates to a nematic liquid crystal composition, including at least two liquid crystal compounds having a cyano group, a compound having an alkoxy group and at least one liquid crystal compound having an n-alkyl group, which is suitable for forming a host liquid crystal for a guest-host type liquid crystal display device.

Liquid crystal displays utilizing the guest-host effect are known. They comprise a dielectrically anisotropic nematic liquid crystal wherein at least one dichroic dye is dissolved to provide a differently colored display upon applying a voltage across the liquid crystal composition. The field-effect type liquid crystal display device provides a display in desired colors if an appropriate dichroic dye is employed. A display substantially of the same quality may be obtained, irrespective of the angle of vision, at low voltage and with low power consumption. Generally speaking, the compositions provide a bright display since they do not require polarizing plates, and if a polarizing plate is used only one is required.

It is common practice to employ a twisted nematic liquid crystal as the host liquid crystal in a guest-host type liquid crystal display. However, it is important to use a host liquid crystal in which the characteristics of the dichroic dye as a guest significantly improve the quality of the display. More specifically, it is important to use a liquid crystal which satisfies the following requirements:

1. high solubility of the dye in the liquid crystal;
2. highly ordered arrangement of the dye;
3. no absorption in the visible region;
4. high environmental resistance and stability;
5. maintenance of the nematic phase over a wide temperature range, including ordinary temperature;
6. high dielectric anisotropy and suitability for low voltage driving; and
7. low viscositiy.

Accordingly, it is desirable to provide a liquid crystal composition which meets the foregoing requirements (1) to (7) and is suitable as a host liquid crystal in a guest-host liquid crystal display. As a result of extensive research efforts, the inventor has discovered a liquid crystal composition which satisfies all of the above-noted requirements specified in (1) to (7).

SUMMARY OF THE INVENTION

Generally speaking, in accordance with the invention, an improved liquid crystal composition is provided. The composition in accordance with the invention includes at least one compound represented by each of the following general formulas:

(1)

(2)

(5)

and further includes at least one compound represented by the following general formulas:

(6)

(7)

wherein $R_1$ stands for a straight-chain alkyl group having 2 to 8 carbon atoms, $R_2$ stands for a straight-chain alkyl group having 2 to 7 carbon atoms, $R_5$ stands for a straight-chain alkyl group having three carbon atoms, $R_6$ stands for a straight-chain alkyl group having two or four carbon atoms, $R_7$ stands for a straight-chain alkyl group having five carbon atoms, $R_8$ stands for a straight-chain alkyl group having two carbon atoms, $R_9$ stands for a straight-chain alkyl group having five carbon atoms, and $R_{10}$ stands for a straight-chain alkyl group having three carbon atoms.

The composition may further include at least one compound represented by each of the following general formulas:

(3)

(4)

wherein $R_3$ stands for a staight-chain alkyl group having 3 to 6 carbon atoms and $R_4$ stands for a straight-chain alkyl group having five carbon atoms.

A dichroic dye completely dissolves in the liquid crystal compositions in accordance with the invention. For example, when an azo or anthraquinone dye is dissolved in the compositions, they provide a highly ordered arrangement. As the compositions do not absorb in the visible region, the color of the dye per se appears vividly. The liquid crystal compositions of this invention provide excellent environmental resistance, since the compounds of the general formula (1) to (7) are stable against optical thermal energy and are not decomposed by moisture in the air. They are suitable for use in fields of application involving a wide range of temperature variation, for example in a motor vehicle as the compositions can maintain their nematic phase over a temperature range of for example −30° C. to 90° C.

As the compositions have high dielectric anisotropy and low viscosity, they provide a guest-host type liquid crystal display which is highly responsive at low voltages. These features render the liquid crystal compositions of this invention suitable for the formation of a excellent host liquid crystal for a guest-host type liquid crystal display.

Accordingly, it is a object of the invention to provide an improved liquid crystal composition.

It is another of the invention to provide an improved liquid crystal display element including the liquid crystal compositions prepared in accordance with the invention;

A further object of the invention is to provide an inproved liquid crystal composition suitable as a host liquid crystal for a guest-host type liquid crystal display.

Still another object of the invention is to provide an improved nematic liquid crystal composition including liquid crystal compounds having a cyano group and a liquid crystal composition having an alkoxy group, and a liquid crystal compound having an akyl group suitable for forming a host liquid crystal for a guest-host type liquid crystal display device.

Still a further object of the invention is to provide an improved guest-host liquid crystal composition wherein the dye is a dichoric dye.

Yet another object of the invention is to provide an improved liquid crystal display device including the liquid crystal compositions prepared in accordance with the invention.

Still other objects and advantages of the invention will in part be obvious and will in part be apparent from the specification.

The invention accordingly comprises a composition of matter possessing the characteristics, properties, and the relation of constituents article which will be exemplified in the compositions and articles hereinafter described, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENTS

The cyano liquid crystal compounds of general formulas (1) and (2) as follows:

(1)

(2)

wherein $R_1$ is a straight chain alkyl group having 2 to 8 carbon atoms and $R_2$ is a straight-chain alkyl group having 2 to 7 carbon atoms, fully dissolve a dichroic dye and give it a highly ordered molecular arrangement. These compounds have high dielectric anisotropy which is useful for imparting responsiveness for low voltage driving. Compounds of formula (2) are effective for realizing fast response, since they have relatively low viscosity. Each of the compounds of formulas (1) and (2) are present in an amount between about 10 to 50 weight percent. The weight percent and all weight percents set forth below are based on the total weight of the composition.

The cyano compounds of general formulas (3) and (4) as follows:

(3)

(4)

wherein $R_3$ is a straight-chain alkyl group having 3 to 6 carbon atoms and $R_4$ is a straight-chain group having 4 carbon aboms, may be included to raise the upper limit of the working temperature range for the liquid crystal material. Use of these compounds in too large a quantity, however, results in an undesirably elevated lower limit of the working temperature range and an increase in viscosity of the liquid crystal composition. Thus, the inventor has found that between about 5 to 20 weight percent of the compounds of formulas (3) and (4) should be present when these compounds are utilized.

The alkoxy liquid crystal compounds of the formula (5)

(5)

wherein $R_5$ is a straight-chain alkyl group having 3 carbon atoms and $R_6$ is a straight-chain alkyl group having 2 or 4 carbon atoms, have very low viscosity and are, therefore useful for imparting fast response time even though its negative dielectric anisotropy is undesirable for low voltage driving. Preferably, one of the compounds of formula (5) is included between about 10 to 30 weight percent.

The n-alkyl liquid crystals compounds of formulas (6) and (7)

(6)

(7)

wherein $R_7$ is a straight-chain alkyl group having 5 carbon atoms, $R_8$ is a straight-chain alkyl group having 2 carbon atoms, $R_9$ is a straight-chain alkyl group having 5 carbon atoms and $R_{10}$ is a straight-chain alkyl group having 3 carbon atoms, have relatively low viscosity and relatively high melting points. Therefore, they raise the upper limit of the working temperature range of the liquid crystal composition without increasing its viscosity. The solubility of a dichroic dye in these compounds is, however, low. Therefore, the compounds of formulas (6) and (7) are present in an amount between about 10 to 30 weight percent and 5 to 20 weight percent, respectively. The compounds of formulas (6) and (7) improve the stability of the guest-host type liquid crystal display against degradation due to optical energy.

In the preferred compositions prepared in accordance with the invention, compounds of formulas (1) and (2), within which the dichroic dye is readily dissolvable, have a high dielectric anisotropy and a relatively low melting point, are present in a combined quantity of between about 20 to 70 percent by weight. It is also preferable to utilize compounds of formulas (6) and (7) in a combined amount of between about 10 and 40 percent by weight. These compounds have a relatively high melting point and dispite the low solubility of the dye therein improve the stability of the guest-host type liquid crystal display against optical energy.

Each compound of formulas (1) to (7) are specifically illustrated by way of example of TABLE 1, wherein $T_M$ represents the melting point and $T_C$ represents the clear point.

TABLE 1

Compounds of the Formula (1):

|   | $R_1$ | $T_M$ [°C.] | $T_C$ [°C.] |
|---|---|---|---|
| A | $C_2H_5$ | 75 | 25 |
| B | $C_3H_7$ | 68 | 25 |
| C | $C_4H_9$ | 46.5 | 16.5 |
| D | $C_5H_{11}$ | 22.5 | 35 |
| E | $C_6H_{13}$ | 14.5 | 29.5 |
| F | $C_7H_{15}$ | 28.5 | 42.5 |
| G | $C_8H_{17}$ | 21 | 40 |

Compounds of the Formula (2):

|   | $R_2$ | $T_M$ [°C.] | $T_C$ [°C.] |
|---|---|---|---|
| H | $C_2H_5$ | 40 | 4 |
| I | $C_3H_7$ | 42 | 45 |
| J | $C_4H_9$ | 41 | 41 |
| K | $C_5H_{11}$ | 30 | 55 |
| L | $C_6H_{13}$ | 42 | 47 |
| M | $C_7H_{15}$ | 30 | 59 |

Compounds of the Formula (3):

|   | $R_3$ | $T_M$ [°C.] | $T_C$ [°C.] |
|---|---|---|---|
| N | $C_3H_7$ | 182 | 258 |
| O | $C_5H_{11}$ | 130 | 239 |
| P | $C_6H_{13}$ | 125 | 228 |

Compounds of the Formula (4):

|   | $R_4$ | $T_M$ [°C.] | $T_C$ [°C.] |
|---|---|---|---|
| Q | $C_5H_{11}$ | 95 | 219 |

Compounds of the Formula (5):

|   | $R_5$ | $R_6$ | $T_M$ [°C.] | $T_C$ [°C.] |
|---|---|---|---|---|
| R | $C_3H_7$ | $C_2H_5$ | 41 | 37 |
| S | $C_3H_7$ | $C_4H_9$ | 35 | 32 |

Compound of the Formula (6):

|   | $R_7$ | $R_8$ | $T_M$ [°C.] | $T_C$ [°C.] |
|---|---|---|---|---|
| T | $C_5H_{11}$ | $C_2H_5$ | 34 | 164 |

Compound of the Formula (7):

|   | $R_9$ | $R_{10}$ | $T_M$ [°C.] | $T_C$ [°C.] |
|---|---|---|---|---|
| U | $C_5H_{11}$ | $C_3H_7$ | 54 | 312 |

Figure 1:
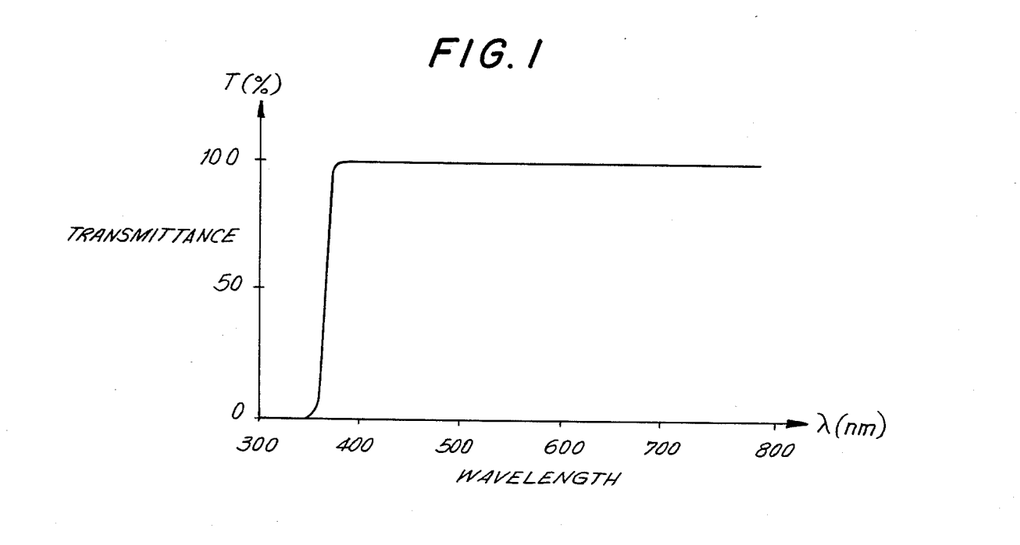
FIG. 1 is a graph illustrating the spectral characteristics of the liquid crystal compositions prepared in accordance with the invention.

FIG. 1 illustrates the spectural characteristics of the liquid crystal compositions prepared in accordance with the invention. As shown in the graph, liquid crystal compositions prepared in accordance with the invention have no absorption in the visible range.

The following TABLE 2 illustrates Examples 1–12 prepared in accordance with the invention. Compounds A–U are those as defined in TABLE 1. The physical properties of each liquid crystal composition of Examples 1–12, the solubility of dyes, dichroic ratio and current density are also set forth.

TABLE 2

| Compound (wt. %) | 1 | 2 | 3 | 4 | 5 | 6 | 7 | 8 | 9 | 10 | 11 | 12 |
|---|---|---|---|---|---|---|---|---|---|---|---|---|
| A |   |   |   |   |   |   |   |   |   |   |   |   |
| B |   |   |   |   |   |   |   |   |   |   |   |   |
| C |   |   |   |   |   |   |   |   |   |   |   |   |
| D |   |   | 20 |   | 23 |   | 20 | 29 | 38 | 10 | 10 | 20 | 15 |
| E |   |   |   |   | 12 |   |   |   |   |   |   |   |
| F |   |   |   |   | 15 |   |   |   |   |   |   |   |
| G |   |   |   |   |   |   |   |   |   |   |   |   |
| H |   |   |   |   |   |   |   |   |   |   |   |   |
| I | 45 | 30 | 35 |   | 17 | 14 | 12 | 10 | 20 | 20 | 20 | 20 |
| J |   |   |   |   |   |   |   |   |   |   |   |   |
| K | 23 | 15 | 18 |   | 22 | 18 | 16 | 14 | 20 | 20 | 20 | 20 |
| L |   |   |   |   |   |   |   |   |   |   |   |   |
| M |   |   |   |   |   |   |   |   |   |   |   |   |
| N |   |   |   |   |   |   |   |   |   |   |   |   |
| O |   |   | 10 | 10 | 10 |   |   |   |   |   | 10 |   | 5 |
| P |   |   |   |   |   |   |   |   |   |   |   |   |
| Q |   |   |   | 10 |   |   |   |   |   | 10 |   |   |
| R | 20 | 15 | 16 | 24 | 16 | 12 | 11 | 10 | 15 | 15 | 15 | 20 |
| S | 12 | 10 | 11 | 16 | 11 | 9 | 8 | 7 |   |   |   |   |
| T |   |   |   |   |   | 23 | 18 | 16 | 14 | 25 | 15 | 15 | 15 |
| U |   |   |   |   |   | 11 | 9 | 8 | 7 | 10 |   | 10 | 5 |
| T [°C.] | 38 | 52 | 69 | 51 | 85 | 77 | 71 | 66 | 93 | 92 | 79 | 74 |
| −30° C., five days |   |   |   |   | o | o | o | x | o | o | o | o |
| η [cp] (5° C.) |   |   |   |   | 47 | 50 | 53 | 54 | 56 | 60 | 55 | 50 |
| Solubility [%] |   |   |   |   |   |   |   |   |   |   |   |   |
| D-16 | 1.0 | 2.0 | 1.5 | 1.0 | 1.0 | 1.0 | 1.5 | 2.0 | 1.5 | 2.0 | 2.0 | 2.0 |

TABLE 2-continued

| | EXAMPLE | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| D-35 | 0.5 | 1.5 | 1.0 | 1.0 | 0.5 | 1.0 | 1.0 | 1.5 | 1.0 | 1.5 | 1.5 | 1.5 |
| GR-8 | 0.5 | 1.0 | 0.5 | 0.5 | 0.5 | 0.5 | 1.0 | 1.0 | 0.5 | 1.0 | 1.0 | 1.0 |
| GY-1 | 0.5 | 1.0 | 0.5 | 0.5 | 0.5 | 0.5 | 0.5 | 1.0 | 0.5 | 1.0 | 1.0 | 1.0 |
| Dichroic Ratio | | | | | | | | | | | | |
| D-16 | | | | | 5.8 | 6.0 | 6.2 | 6.3 | 6.5 | 6.8 | 6.7 | 6.7 |
| D-35 | | | | | 6.5 | 6.6 | 6.8 | 6.9 | 7.0 | 7.2 | 7.2 | 7.3 |
| GR-8 | | | | | 6.1 | 6.2 | 6.4 | 6.7 | 6.9 | 7.1 | 7.1 | 7.2 |
| GY-1 | | | | | 7.0 | 7.2 | 7.5 | 7.9 | 8.1 | 8.4 | 8.3 | 8.5 |
| Current Density [$\mu A/cm^2$] (outdoor exposure) | | | | | | | | | | | | |
| D-16 | | | | | | | | | | | | |
| $I_o$ | 2.2 | 2.6 | 2.5 | 2.6 | 2.0 | 2.2 | 2.4 | 2.6 | 2.4 | 2.6 | 2.6 | 2.6 |
| $I_t$ | 2.4 | 2.9 | 2.7 | 2.8 | 2.0 | 2.3 | 2.5 | 2.6 | 2.5 | 2.6 | 2.6 | 2.7 |
| D-35 | | | | | | | | | | | | |
| $I_o$ | 2.2 | 2.5 | 2.6 | 2.7 | 2.0 | 2.2 | 2.5 | 2.7 | 2.4 | 2.7 | 2.7 | 2.7 |
| $I_t$ | 2.4 | 2.7 | 2.8 | 2.9 | 2.0 | 2.2 | 2.6 | 2.8 | 2.5 | 2.8 | 2.8 | 2.8 |
| GR-8 | | | | | | | | | | | | |
| $I_o$ | 2.3 | 2.6 | 2.8 | 2.7 | 2.3 | 2.5 | 2.8 | 3.0 | 2.6 | 2.7 | 2.8 | 2.8 |
| $I_t$ | 11.4 | 13.8 | 14.2 | 15.0 | 2.7 | 2.9 | 3.4 | 2.9 | 3.0 | 3.6 | 3.5 | |
| GY-1 | | | | | | | | | | | | |
| $I_o$ | 2.3 | 2.5 | 2.7 | 2.8 | 2.2 | 2.4 | 2.7 | 2.9 | 2.5 | 2.7 | 2.8 | 2.7 |
| $I_t$ | 11.0 | 12.7 | 14.1 | 15.5 | 2.6 | 2.9 | 3.4 | 3.4 | 2.8 | 3.0 | 3.5 | 3.5 |

In TABLE 2, the symbol o indicates that the liquid crystal composition did not undergo any abnormal change when it had been left in a cell at a temperature of $-30°$ C. for five days and the symbol x indicates that the precipitation of crystals took place. The symbol $\eta$ indicates the viscosity of the liquid crystal at $5°$ C. The solubility of dyes in each liquid crystal composition was examined by employing four dichroic dyes, i.e., anthraquinone dyes D-16 (blue) and D-35 (purplish red) manufactured by B.D.H. Chemicals, and azo dyes GR-8 (orange) and GY-1 (yellow manufactured by Nipon Kanko Shikiso Kenkyujo (Japan Photosensitive Pigment Research Institute) in a range of 0 to 3.0% by weight with increments of 0.5% by weight. These dyes were also examined for dichroic ratio. Outdoor exposure light resistance tests were conducted by applying an electric current having a rectangular waveform at 6 V and 64 Hz in order to ascertain the stability of the dichroic dye in the hose liquid crystal against optical energy. In TABLE 2, $I_0$ indicates the initial current density and $I_t$ indicates the current density obtained after ten days of outdoor exposure.

The molecular formula of the D-16 dye is as follows:

The molecular formula of the D-35 dye is as follows:

The molecular formula of the GR-8 dye is as follows:

The molecular formula of the GY-1 dye is as follows:

The compositions of Examples 1 to 5 were prepared to examine the solubility of the dichroic dyes in the various compounds employed in this invention. The outdoor exposure light resistance tests were performed to examine their stability. The composition of Example 2 exhibited higher solubility of the dye then Examples 1 and 3 to 5. Example 5 demonstrates that a smaller increase in current density results as a result of the outdoor exposure light resistance test than Examples 1 to 4. The results of Examples 1 to 5, and also of Examples 6 to 8 were studied comparatively. As a result, it has been found that the solubility of the dyes is higher in the compounds of the formulas (1) and (2) than in any other compound, while the compound of the formula (1) is effective for the orderly arrangement of the dye, and that the compounds of the formulas (6) and (7) serve to inhibit any appreciable increase in current density that might otherwise be caused by outdoor exposure to light.

The results of these tests were taken into account for preparing the liquid crystal compositions of Examples 9 to 12. It is noted that they are usable over a wide temperature range, and excellent for the dissolution and orderly arrangement of the dichroic dyes.

TABLE 3 shows similar data on commercially available Merck E7 and E8 nematic liquid crystals, including viscosity, solubility of the dyes, dichroic ratio and variation in current density of outdoor exposure to light. It is obvious from a comparison between the data shown in TABLE 3 and the data on the compositions of Examples 9 to 12 of this invention shown in TABLE 2 that the liquid crystal compositions of this invention are superior to the known liquid crystals as a host liquid crystal for a guest-host type liquid crystal display.

TABLE 3

|  |  | E7 | E8 |
|---|---|---|---|
| $T_C$ [°C.] | | 60.5 | 71 |
| $\eta$ [cp] (5° C.) | | 122 | 151 |
| Solubility [%] | | | |
| D-16 | | 1.0 | 1.5 |
| D-35 | | 1.0 | 1.0 |
| GR-8 | | 0.5 | 0.5 |
| GY-1 | | 0.5 | 0.5 |
| Dichroic Ratio | | | |
| D-16 | | 6.2 | 6.4 |
| D-35 | | 6.9 | 7.0 |
| GR-8 | | 6.7 | 6.9 |
| GY-1 | | 7.7 | 7.8 |
| Current Density [$\mu A/cm^2$] (outdoor exposure) | | | |
| D-16 | $I_o$ | 2.4 | 2.6 |
| | $I_t$ | 2.7 | 2.9 |
| D-35 | $I_o$ | 2.3 | 2.5 |
| | $I_t$ | 2.7 | 2.9 |
| GR-8 | $I_o$ | 2.3 | 2.6 |
| | $I_t$ | 14.7 | 15.2 |
| GY-1 | $I_o$ | 2.4 | 2.5 |
| | $I_t$ | 15.8 | 14.2 |

Figure 2:
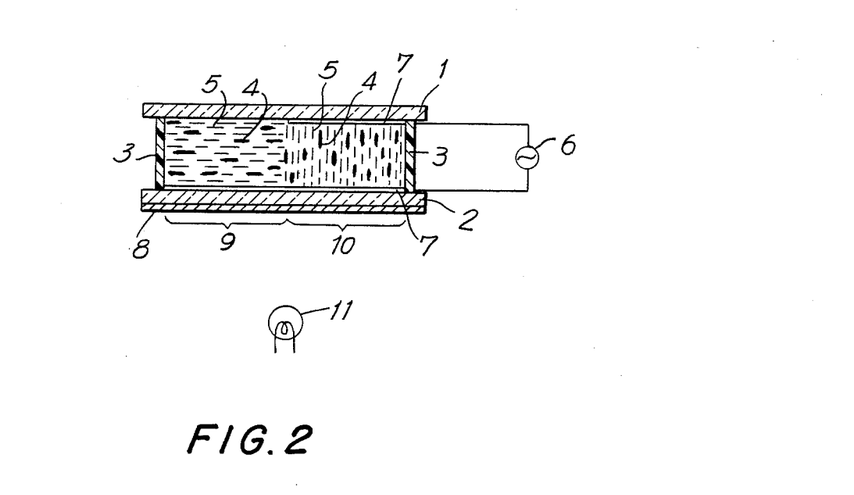
FIG. 2 is a cross-sectional view illustrating a transmission-type black guest-host liquid crystal display panel including a liquid crystal composition in accordance with the invention.

Referring now to FIG. 2, a cross-sectional view of a transmission-type black guest-host liquid crystal panel including a liquid crystal composition in accordance with the invention is shown. The liquid crystal panel includes an upper transparent plate 1 and a lower transparent plate 2 which are both horizontally oriented with a spacer 3 disposed therebetween for defining a space filled with a nematic liquid crystal composition 5. Liquid crystal composition 5 is a composition prepared in accordance with the invention and includes a black dichroic dye 4 dissolved therein. A source 6 of alternating current is provided for applying a threshold or higher voltage to transparent electrode 7 disposed on the interior surfaces of transparents plates 1 and 2.

In this illustrated embodiment, a polarizing plate 8 is externally provided with its axis of polarization extending parallel to the direction in which dye 4 is oriented. In a non-selected portion 9 of the panel, molecules of dye 4 present a black color as they absorb polarized light emitted by source of light 11 which has passed through polarizing plate 8. In a selected portion 10 of the panel; however, molecules of dye 4 absorbs little incident light as they lie perpendicular to transparent plates 1 and 2. It is therefore possible to establish a negative display by a combination of the non-selected portions wherein the dye presents a black color and the selected portion wherein it is colorless.

A preferred mixture of dyes includes dyes D-16, D-35, GR-8 and GY-1 in a ratio of 0.6:0.1:0.1:0.2 as the black dye. The dye was dissolved in a liquid crystal composition of the formulation of Example 10 present in a concentration of 4% by weight. The guest-host panel had a cell thickness of 10 microns. It was driven at 6 V and 64 Hz, and its electro-optical characteristics were as shown in TABLE 4.

TABLE 4

|  | −20° C. | 0° C. | 25° C. |
|---|---|---|---|
| $t_r$ [ms] | 900 | 140 | 70 |
| $t_f$ [ms] | 500 | 300 | 80 |
| C | 23 | 21 | 20 |

In this TABLE 4, $t_r$ and $t_f$ represent the rise time and the fall time, respectively and C is the contrast.

The above description demonstrates that liquid crystal compositions providing an excellent host for a guest-host type liquid crystal display are obtained in accordance with the invention. Application of this invention to the guest-host mode is effective for realizing a color liquid crystal display having high contrast and fast response over a wide temperature range which is capable of operation at low voltages. Although a dichroic dye has been of little practical value when used with conventionally known liquid crystal compositions due to an increase in current density by exposure to light, use of the liquid crystal composition in accordance with this invention as the host improves the reliability of the dye dramatically and renders it of practical usefulness.

It will thus be seen that the objects set forth above, among those made apparent from the preceding description, are efficiently attained and, since certain changes may be made in carrying out the aboe process, in the described product, and in the construction set forth without departing from the spirit and scope of the invention, it is intended that all matter contained in the above description and shown in the accompanying drawings shall be interpreted as illustrative and not in a limiting sense.

It is also to be understood that athe following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

As used in the specification and claims, the symbol is a phenyl ring and the symbol is a cyclohexyl ring.

What is claimed is:

1. A liquid crystal composition for a guest-host type liquid crystal display, comprising at least one of each of compounds (1), (2) and (5) represented by the following general formulas:

(1)

(2)

(5)

including at least one of each compound of the formulas (6) and (7) represented as follows:

(6)

(7)

and a mixture of an anthraquinone dye and an azo dye wherein $R_1$ represents a straight-chain alkyl group having from 2 to 8 carbon atoms, $R_2$ represents a straight-chain alkyl group having from 2 to 7 carbon atoms, $R_5$ represents a straight-chain alkyl group having 3 carbon atoms, $R_6$ represents a straight-chain alkyl group having 2 or 4 carbon atoms, $R_7$ represents a straight-chain alkyl group having 5 carbon atoms, $R_8$ represents a straight-chain alkyl group having 2 carbon atoms, $R_9$ represents a straight-chain alkyl group having 5 carbon atoms and $R_{10}$ represents a straight-chain alkyl group having 3 carbon atoms, the compound represented by formula (1) being present between about 10 to 29 percent by weight, the compound represented by formula (2) being present between about 10 to 50 percent by weight, the compound represented by formula (5) being present between about 10 to 30 percent by weight, the compound represented by formula (6) being present between about 10 to 30 percent by weight and the compound represented by formula (7) being present between about 5 to 20 percent by weight, the compounds represented by formulas (1) and (2) being present collectively between about 20 to 70 percent by weight and the compounds represented by the formulas (6) and (7) being present collectively between about 10 to 40 percent by weight, said composition having a positive dielectric anisotropy.

2. The liquid crystal composition of claim 1, further including at least one compound represented by each of formulas (3) and (4) as follows:

(3)

(4)

wherein $R_3$ represents a straight-chain alkyl group having 3, 5 and 6 carbon atoms and $R_4$ represents a straight-chain alkyl group having 5 carbon atoms.

3. The liquid crystal composition of claim 2, wherein the compound represented by formula (3) is present between about 5 to 10 percent by weight and about 10 weight percent of the compound represented by formula (4).

4. In a guest-host type liquid crystal display element including a liquid crystal display cell including a liquid crystal composition as a host and a dye as a guest, the liquid crystal composition comprising at least one of each of compounds (1), (2) and (5) represented by the following general formulas:

(1)

(2)

(5)

and including at least one of each compound of the formulas (6) and (7) represented as follows:

(6)

(7)

wherein $R_1$ represents a straight-chain alkyl group having from 2 to 8 carbon atoms, $R_2$ represents a straight-chain alkyl group having from 2 to 7 carbon atoms, $R_5$ represents a straight-chain alkyl group having 3 carbon atoms, $R_6$ represents a straight-chain alkyl group having 2 or 4 carbon atoms, $R_7$ represents a straight-chain alkyl group having 5 carbon atoms, $R_8$ represents a straight-chain alkyl group having 2 carbon atoms, $R_9$ represents a straight-chain alkyl group having 5 carbon atoms and $R_{10}$ represents a straight-chain alkyl group having 3 carbon atoms, the compound represented by formula (1) being present between about 10 to 29 percent by weight, the compound represented by formula (2) being present between about 10 to 50 percent by weight, the compound represented by formula (5) being present between about 10 to 30 percent by weight, the compound represented by formula (6) being present between about 10 to 30 percent by weight and the compound represented by formula (7) being present between about 5 to 20 percent by weight, the compounds represented by formulas (1) and (2) being present collectively between about 20 to 70 percent by weight and the compounds represented by the formula (6) and (7) being present collectively between about 10 to 40 percent by weight, said composition having a positive dielectric anisotropy as a host, and a dichroic dye as a guest, said dye including a mixture of an anthraquinone dye and an azo dye.

5. The liquid crystal display element of claim 4, wherein said dye has a black color.

6. The liquid crystal display element of claim 4, wherein said mixture includes dyes represented by the following molecular formulas:

8. The liquid crystal display element of claim 4, wherein the cell has a thickness of about 10 microns.

9. The liquid crystal display element of claim 4 for use in a motor vehicle.

10. The liquid crystal display element of claim 4, including an upper transparent plate and an opposed lower transparent plate, a spacer disposed between said plates to define a space therebetween, the space filled with the liquid crystal composition, the liquid crystal composition being oriented in one direction in the space and a single polarizing plate provided external to the transparents plates and having its axis of polarization extending parallel to the direction of the molecules of the dye in the liquid crystal composition.

11. The liquid crystal display element of claim 10, further including a transparent electrode means deposited on each of the interior surfaces of the transparent plates for defining a nonselected portion wherein the molecules of dye are oriented in parallel to the transparent plates and a selected portion wherein the molecules of the dye are oriented perpendicularly to the transparent plates in response to application of AC voltage applied to opposed electrode means across the liquid crystal composition at a treshold or higher voltage so that a dichroic display is obtained.

in a ratio by weight of approximately 0.6:0.1:0.1:0.2, as a black dye.

7. The liquid crystal display element of claim 4, wherein the dye is present from an effective amount to about 4 percent by weight.

12. A liquid crystal display device including a liquid crystal display element having an upper base plate and an opposed lower base plate spaced apart therefrom and a spacer disposed therebetween to define a space which is filled with a liquid crystal composition including a dichroic dye dissolved therein, the liquid crystal composition comprising at least one of each of compounds (1), (2) and (5) represented by the following general formulas:

(1)

(2)

(5)

and including at least one of each compound of the formulas (6) and (7) represented as follows:

(6)

(7)

and a mixture of an anthroquinone dye and an azo dye wherein $R_1$ represents a straight-chain alkyl group having from 2 to 8 carbon atoms, $R_2$ represents a straight-chain alkyl group having from 2 to 7 carbon atoms, $R_5$ represents a straight-chain alkyl group having 3 carbon atoms, $R_6$ represents a straight-chain alkyl group having 2 or 4 carbon atoms, $R_7$ represents a straight-chain alkyl group having 5 carbon atoms, $R_8$ represents a straight-chain alkyl group having 2 carbon atoms, $R_9$ represents a straight-chain alkyl group having 5 carbon atoms and $R_{10}$ represents a straight-chain alkyl group having 3 carbon atoms, the compound represented by formula (1) being present between about 10 to 29 percent by weight, the compound represented by formula (2) being present between about 10 to 50 percent by weight, the compound represented by formula (5) being present between about 10 to 30 percent by weight, the compound represented by formula (6) being present between about 10 to 30 percent by weight and the compound represented by formula (7) being present between about 5 to 20 percent by weight, the compounds represented by formulas (1) and (2) being present collectively between about 20 to 70 percent by weight and the compounds represented by the formulas (6) and (7) beinng present collectively between about 10 to 40 percent by weight, the liquid crystal composition being oriented in one direction parallel to the surfaces of the transparent plates, a single polarizing plate provided external to the transparent plates with its axis of polarization extending parallel to the orientation direction of the dye molecules, and transparent electrode means deposited on the interior surfaces of the transparent plates for providing a non-selected region wherein dye molecules are oriented parallel to the transparent plate and a selected region wherein the dye molecules are adapted to orient perpendicular to the transparent plates in response to AC voltage applied to the liquid crystal composition disposed between opposed electrode means at a threshold or higher voltage for providing a dichroic display.

13. The liquid crystal display device of claim 12, wherein said threshold voltage is about 6 V.

14. In a guest-host type liquid crystal display element of claim 4 including a liquid crystal display cell including a liquid crystal composition as a guest and a dye as a host, the liquid crystal composition further comprising at least one compound represented by each of formulas (3) and (4) as follows:

(3)

(4)

wherein $R_3$ represents a straight-chain alkyl group having 3, 5 and 6 carbon atoms and $R_4$ represents a straight-chain alkyl group having 5 carbon atoms.

15. The liquid crystal display element of claim 4, wherein $R_1$ represents a straight-chain alkyl group having 5 carbon atoms, $R_2$ represents a straight-chain alkyl group having from 3 to 5 carbon atoms, $R_5$ represent a straight-chain alkyl group having 3 carbon atoms, $R_6$ represents a straight-chain alkyl group having 2 to 4 carbon atoms, $R_7$ represents a straight-chain alkyl group having 2 or 4 carbon atoms, $R_7$ represents a straight-chain alkyl group having 5 carbon atoms, $R_8$ represents a straight-chain alkyl group having 2 carbon atoms, $R_9$ represents a straight-chain alkyl group having 5 carbon atoms and $R_{10}$ represents a straight-chain alkyl group having 3 carbon atoms.

16. The liquid crystal display element of claim 14, wherein $R_3$ represents a straight-chain alkyl grouphaving 5 carbon atoms and $R_4$ represents a straight-chain alkyl group having 5 carbon atoms.

17. In a guest-host type liquid crystal display element including a liquid crystal display cell including a liquid crystal composition as a host and a dye as a guest, the liquid crystal composition comprising at least one of each of compounds (1), (2) and (5) represented by the following general formulas:

(1)

(2)

and including at least one of each compound of the formulas (6) and (7) represented as follows:

and a mixture of an anthroquinone dye and an azo dye wherein $R_1$ represents a straight-chain alkyl group having from 2 to 8 carbon atoms, $R_2$ represents a straight-chain alkyl group having from 2 to 7 carbon atoms, $R_5$ represents a straight-chain alkyl group having 3 carbon atoms, $R_6$ represents a straight-chain alkyl group having 2 or 4 carbon atoms, $R_7$ represents a straight-chain alkyl group having 5 carbon atoms, $R_8$ represents a straight-chain alkyl group having 2 carbon atoms, $R_9$ represents a straight-chain alkyl group having 5 carbon atoms and $R_{10}$ represents a straight-chain alkyl group having 3 carbon atoms, the compound represented by formula (1) being present between about 10 to 29 percent by weight, the compound represented by formula (2) being present between about 28 to 40 percent by weight, the compound represented by formula (5) being present between about 15 to 21 percent by weight, the compound represented by formula (6) being present between about 15 to 25 percent by weight and the compound represented by formula (7) being present between about 5 to 10 percent by weight, the compounds represented by formulas (1) and (2) being present collectively between about 38 to 69 percent by weight and the compounds represented by the formulas (6) and (7) being present collectively between about 20 to 35 percent by weight, said composition having a positive dielectric anisotropy as a host, and a dichroic dye as a guest, said composition having a positive dielectric anisotropy.

* * * * *